United States Patent [19]

Farrall et al.

[11] Patent Number: 4,918,576
[45] Date of Patent: Apr. 17, 1990

[54] PHOTOGRAPHIC FLASH LIGHTING UNIT

[75] Inventors: William R. Farrall, Grand Island; Donald R. Farrall, Lincoln, both of Nebr.

[73] Assignee: Farrall Instruments, Inc., Grand Island, Nebr.

[21] Appl. No.: 273,255

[22] Filed: Nov. 18, 1988

[51] Int. Cl.⁴ .......................................... G03B 15/02
[52] U.S. Cl. ...................................... 362/11; 362/236; 362/250; 362/368
[58] Field of Search .................... 354/126, 134, 145.1; 362/11, 13, 12, 18, 236, 250, 319, 362, 368

[56] References Cited

U.S. PATENT DOCUMENTS

| | | | |
|---|---|---|---|
| 2,736,879 | 2/1956 | Ferguson | 362/236 |
| 3,302,017 | 1/1967 | Hansen et al. | 362/368 |
| 3,999,160 | 12/1976 | McDonnell | 362/391 |
| 4,302,800 | 11/1981 | Pelletier | 362/368 |
| 4,447,859 | 5/1984 | Raczynski | 362/11 |
| 4,460,947 | 7/1984 | Kelly | 362/362 |
| 4,511,233 | 4/1985 | Kazami | 354/145.1 |
| 4,707,766 | 11/1987 | Bertozzi et al. | 362/362 |
| 4,754,389 | 6/1988 | Moberg | 354/145.1 |

OTHER PUBLICATIONS

"White Lighting Ultra", by Paul C. Buff, Inc., 530 E. Iris Drive, Nashville, TN, 4 pages.

Primary Examiner—Ira S. Lazarus
Assistant Examiner—Sue Hagarman
Attorney, Agent, or Firm—Welsh & Katz, Ltd.

[57] ABSTRACT

A photographic flash lighting unit includes a tubular housing which is preferably hexagonal in cross-section and is defined by a plurality of elongate side faces, each of the side faces are provided with a coupling formation and are divided into a first plurality of faces having a male coupling formation, and a second plurality of faces having a female coupling formation adapted to matingly engage the male formations of like flash units, the faces are arranged upon the housing so that the male and female coupling formations alternate thereon. Locking members are provided on selected faces of the housing to prevent relative movement of matingly engaged housings. The housing is further provided with a flash lamp and a connector and associated circuitry to enable a photographic power supply to be connected to the housing for energization of the flash. An optional adapter cord allows the unit to be powered by power supplies of domestic as well as foreign manufacture.

24 Claims, 5 Drawing Sheets

PHOTOGRAPHIC FLASH LIGHTING UNIT

BACKGROUND OF THE INVENTION

The present invention relates to photographic flash equipment and, specifically, to electronic flash equipment of the type designed for professional use.

Currently, various types of professional, high power, electronic photographic flash equipment exist. This equipment typically includes one or more independently-supported separate flash units which may be a electrically interconnected for simultaneous firing. The user can vary the light intensity on the subject by changing the type or configuration of the reflector shell used with such flash units. Also, each flash unit may include controls whereby the user can effect a limited variation in flash intensity for each unit. It is also possible to vary the number of flash units used, but this necessarily affects the light quality and intensity directed at the subject, since the light is now coming from a number of spaced-apart sources rather than from a single source.

Due to the wide variety of subject matter photographed by professional photographers, the ideal flash lighting system will be capable of rapid rearrangement of the number and configuration of flash units for desired synchronization of flash frequency and intensity. Many conventional flash units are equipped with their own power packs, and as such these units are often cumbersome as well as expensive, in that power supply components are duplicated unnecessarily.

Another disadvantage of conventional flash units which are capable of being physically connected to other like units is that they are not capable of being arranged in a sufficiently wide variety of configurations to provide the broadest possible range of lighting conditions. Conventional units are principally cylindrical and as such, are not capable of being interconnected with like units. Flash units are available which are rectangular in cross-section; however, these units are only capable of being interconnected with adjacent units along vertical or horizontal axes.

Thus, there is a need for a professional type photographic flash lighting unit which is adapted to be readily connected, physically and electrically, to like units to form a wide variety of arrays including, but not limited to vertical, horizontal, 'Y'-shaped as well as circular or semi-circular arrays, to be easily connected to, or configured to operate with, many different types of conventional photographic power packs or other photographic equipment provided by various manufacturers, and to be adaptable to be used with electrical voltages supplied domestically in the United States as well as in foreign countries.

SUMMARY OF THE INVENTION

Accordingly, a photographic flash lighting apparatus is provided with a configuration designed to interconnect with similar like units, each such unit including a tubular housing which is polygonal in cross-section and has first and second ends, the housing having a plurality of elongate parallel side faces, each of said faces having a coupling formation, a first plurality of the faces having male coupling formations, and a second plurality of the faces having female coupling formations configured to matingly engage the male coupling formations of like flash units. The side faces having male coupling formations are disposed around the outer periphery of the housing in alternating relationship to the faces having female coupling configurations.

Each unit is provided wit a locking assembly designed to prevent undesired relative movement between matingly engaged photographic flash units. The locking assembly includes a plurality of openings, at least one of which being located in each side face, and the openings formed in an annular ring located near one end of the housing. In selected side faces, a spring-biased pin member is located and provided with pins which project through the openings in the housing and outward beyond the side face. The pins are arranged to lockingly engage the openings of mating side faces of adjacent units. Thus, any side face may be connected to a mating side face of an adjacent unit.

Each unit further includes a flash lamp mounted within the housing so as to project axially from a first end thereof, a connector mounted to the second end of the housing for connection to a power supply, such as a photographic power pack, and a circuit located within the housing to connect the connector to the lamp for energization thereof.

Groups of the flash units of the invention may be combined in a wide variety of arrangements to provide optimum lighting conditions for professional photographers. The units of the invention may be arranged in horizontal or vertical arrays, as well as 'Y'-shaped or circular arrays.

DESCRIPTION OF THE PREFERRED EMBODIMENT

Figure 1:
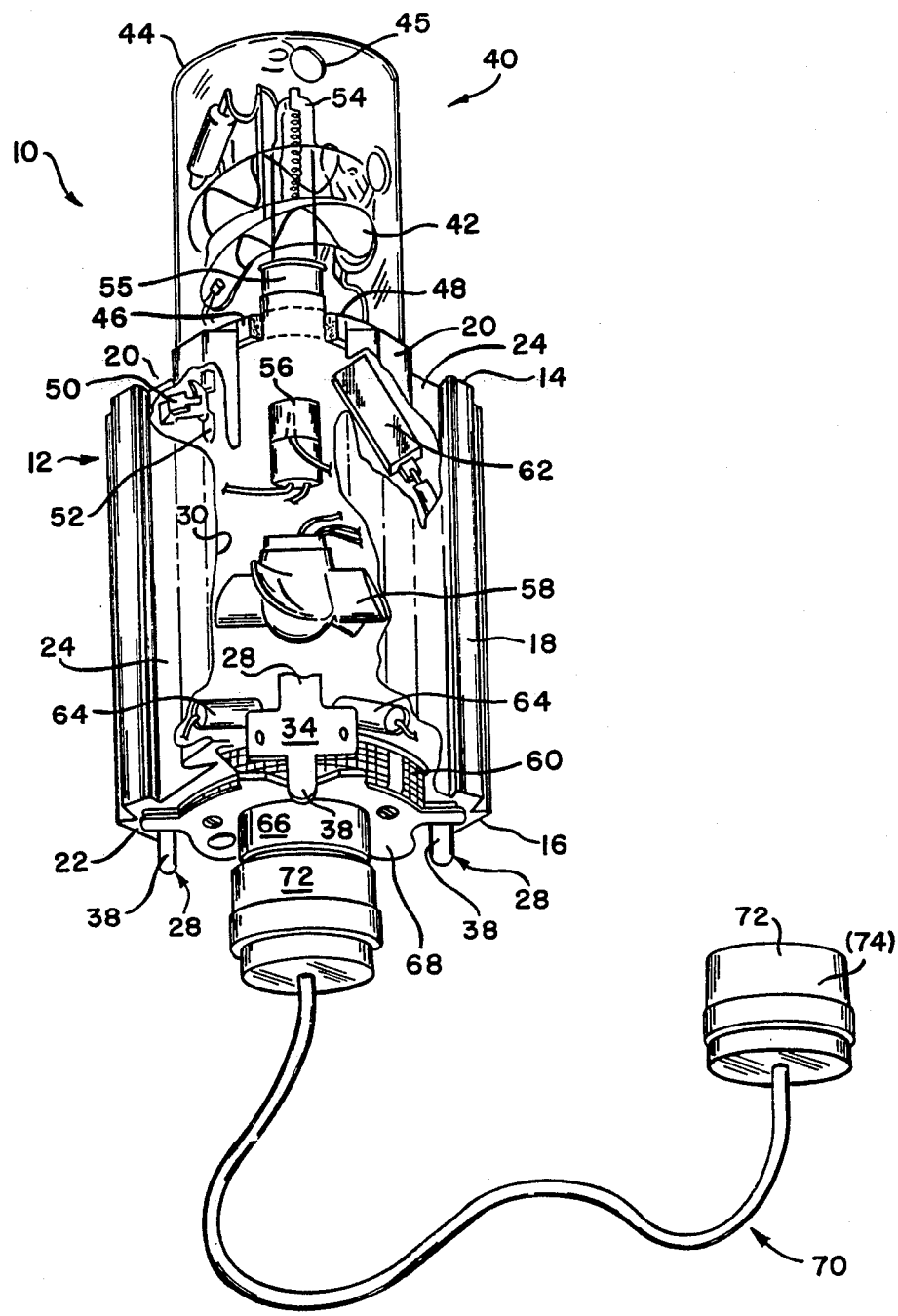
FIG. 1 is a front perspective elevational view of the photographic lighting unit of the invention, with portions shown broken away for clarity.
Figure 2:
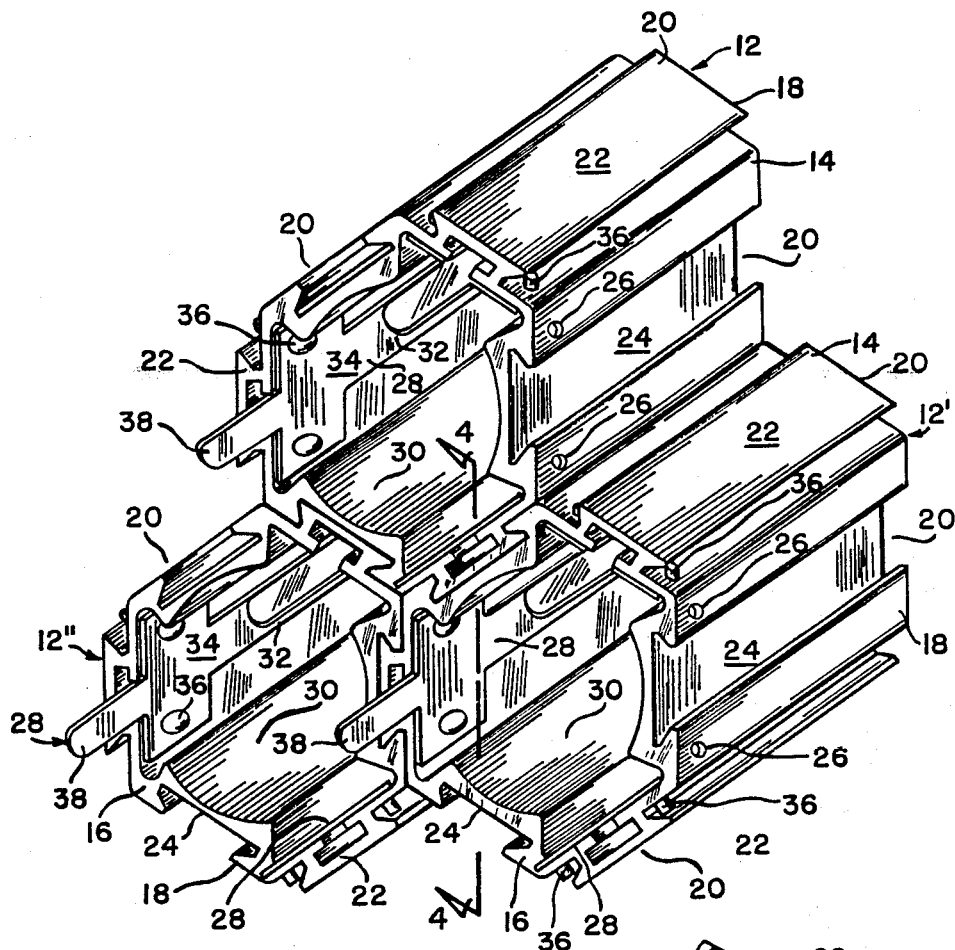
FIG. 2 is a front perspective elevational view showing three housings of the unit of the invention being connected to each other.

Referring now to the drawings, wherein like reference characters designate like features, and specifically to FIGS. 1 and 2, the photographic flash lighting unit of the invention is shown and is generally designated 10. The unit 10 includes a housing 12 of tubular construction and appearing hexagonal in cross-section (best shown in FIG. 2) although other polygonal configurations are contemplated. The housing is preferably fabricated of extruded aluminum or other rigid, lightweight material, and includes a first end 14 and a second end 16. The outer peripheral surface 18 of the housing 12 is defined by a plurality of, or in the preferred embodiment, six, elongate side faces 20, each of the side faces being disposed in parallel relation to each other. Each side face 20 is provided with a coupling assembly which takes the form, in alternating faces, of a male dovetail tongue formation 22 and a mating female dovetail groove formation 24. The tongue and groove formations 22 and 24 preferably extend the entire length of the housing 12 and are dimensioned to slidingly engage each other to permit the attachment of like units 10 in parallel relation to each other (best shown in FIG. 2).

Once joined, the units 10 of the invention are releasably locked to each other against relative axial movement in the following manner. A plurality of openings 26 is disposed annularly about the housing 12 near the second end 16. At least one opening 26 is located on each face 20, and in the preferred embodiment a pair of openings 26 are located on each such face (the openings 26 best shown in FIG. 2).

A spring clip 28 having a substantially 'T'-shaped configuration is provided on an interior surface 30 of each of the side faces 20 having the male dovetail tongue formation 22. However, it is contemplated that the clips 28 may alternatively be provided on the inside of the faces 20 having the mating female groove formation 24.

Figure 3:
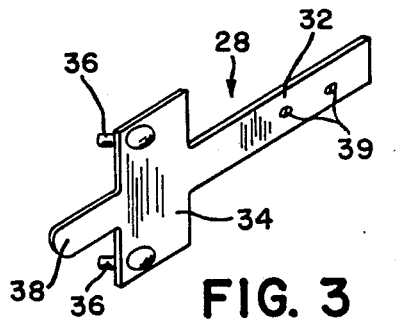
FIG. 3 is a front perspective elevational view of the locking bi-pin spring clip of the invention.

Referring now to FIGS. 2 and 3, each spring clip 28 is configured to have an elongate stem portion 32, a crosspiece 34 having at least one rigid locking pin 36 attached thereto, and a manipulator tab 38 which is substantially coaxial with the stem portion 32. The spring clip 28, preferably fabricated of stainless steel, is secured at its stem portion 32 to the interior surface 30 of the faces 20 by a plurality of rivets 39 or similar fasteners. The attachment of the spring clip 28 in this manner to the interior 30 of the housing 12 provides it with an inherent biasing force against the interior surface. In addition, the spring clip 28 is positioned within the housing 12 so that the pins 36 project through the corresponding openings 26 in the respective side face 20. The pins 36 project outwardly through the openings 26 to engage openings 26 of mating side faces 20 of an adjacent unit 10. The openings 26 thus may be referred to as lock receiving openings.

Figure 4:
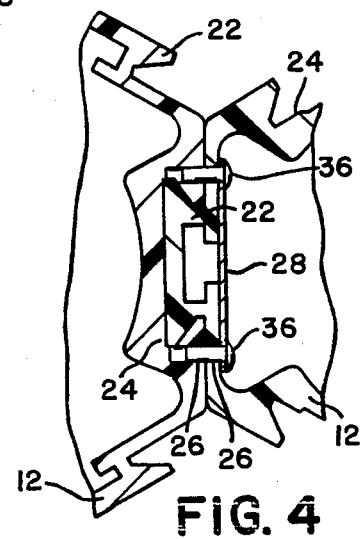
FIG. 4 is a vertical sectional view taken along the line 4—4 of FIG. 2, and in the direction generally indicated, with portions broken away for clarity.

Referring now to FIGS. 2 and 4, the male dovetail tongue formations 22 are adapted to matingly engage the female dovetail groove formations 24 of adjacent housings 12. The respective male and female tongue and groove formations 22 and 24 are dimensioned to provide a sliding friction fit between adjacent units 10. Once the housings 12 of adjacent units 10 are slidingly engaged along opposing side faces thereof, as between housings 12, 12' and 12" of FIG. 2, the corresponding manipulator tabs 38 are actuated by the user against the biasing force so as to retract the pins 36 within the openings 26 and thus allow the units 12, 12' and 12" to become aligned relative to each other until the adjacent ends 16 as well as the ends 14 are in alignment. Once alignment is achieved, the manipulator tabs 38 are released and the pins 36 engage the openings 26 of the mating side faces 20 of the adjacent units 12, 12' and 12". The units are thus releasably locked against relative movement along the axial direction. The unit 10 may be released merely by manipulation of the clips 28.

Figure 6:
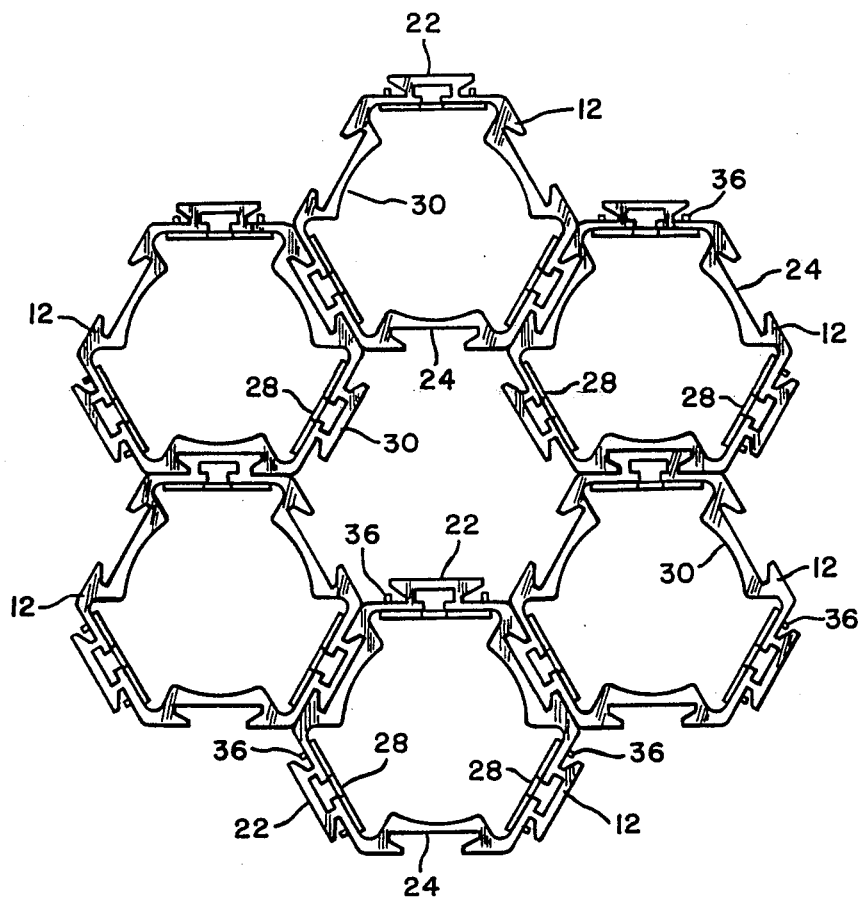
FIG. 6 is a front elevational view of the housings of units of the invention showed arranged in a circular configuration.
Figure 7:
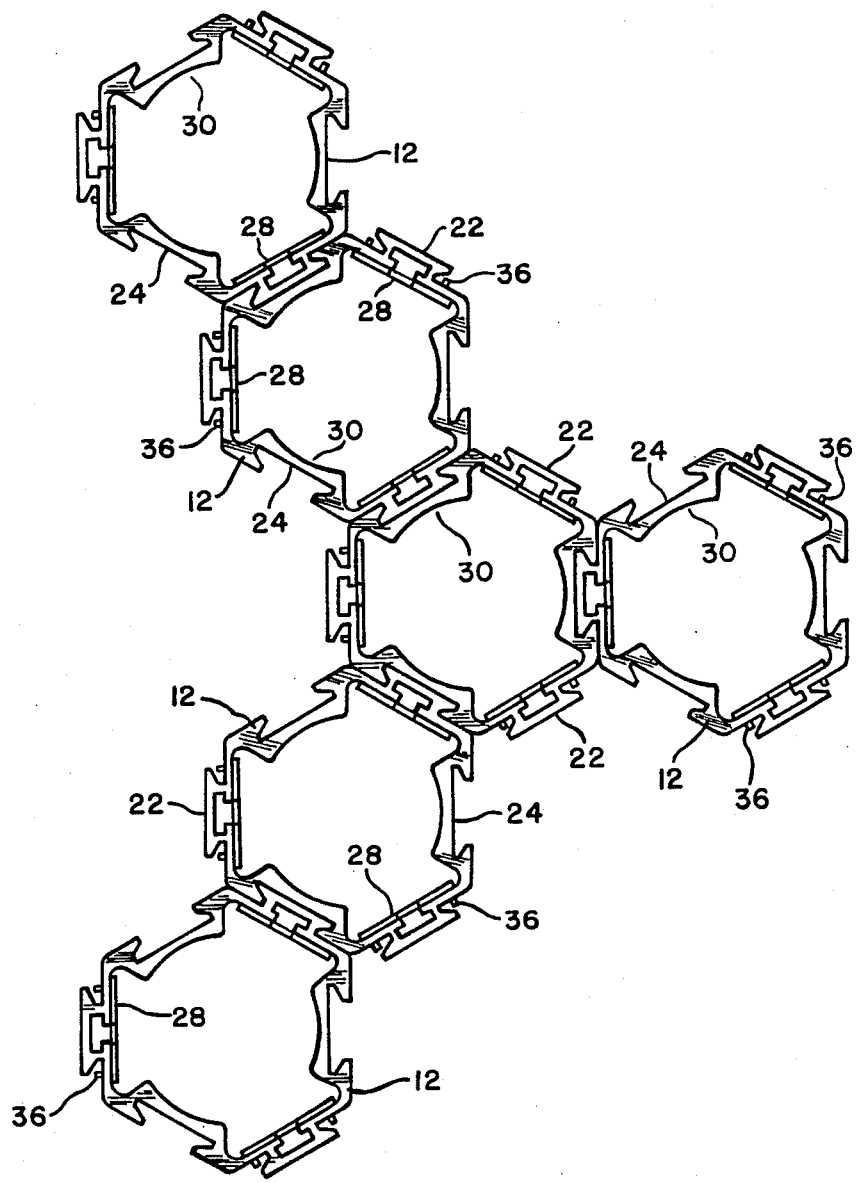
FIG. 7 is a front elevational view of housings of the unit of the invention shown arranged in a 'Y' configuration.

Referring now to FIGS. 2, 6 and 7, the preferred hexagonal configuration of the housing 12 allows the arrangement of varying shapes thereof, including, but not limited to, close knit clusters as shown in FIG. 2, a circular configuration as shown in FIG. 6, and even a 'Y' orientation as shown in FIG. 7. In the embodiment of FIG. 6, a center unit 10 may or may not be included therein. The arrangement of the housings 12 may be changed at the whim of the photographer by releasing the respective spring clips 28 and sliding the housings 12 relative to each other. Regardless of the arrangement, the configuration of the housing 12 permits adjacent units 10 to be interconnected along any side face 20. In this manner, a wide variety of lighting conditions may be achieved. In addition, the exact dimensional configuration of the male tongues and female dovetail grooves 22, 24, respectively, may preferably be designed to matingly engage corresponding formations of related photographic equipment.

Referring again to FIG. 1, the lighting unit 10 of the invention further includes a lamp element 40 having a flash tube 42 enclosed within an outer transparent cover 44 fabricated of a heat resistant transparent material such as PYREX or the like. At least one opening 45 is provided in the cover 44 for ventilation. The flash tube 42 is provided with a ceramic base 46 having a metal reflective layer 48 applied thereon by sputtering to increase the efficiency of the unit. It has been found that applying the reflective layer 48 increases the resulting light output from a unit by at least 0.2 f-stops.

The lamp element 40 is secured to the first end 14 of the housing 12 so as to project axially therefrom and is connected thereto by means of a plurality of bi-spring flash tube connectors 50, only one of which is depicted in FIG. 1. Each bi-spring flash tube connector 50 is adapted to accommodate a bayonet pin 52 attached to a base end of the lamp element 40 in conventional fashion. At least one halogen modeling lamp 54 is located closely adjacent the flash tube 42 and is inserted into a socket 55. The socket 55 is mounted to the housing 12 independently of the lamp unit 40, although the modeling lamp 54 is enclosed by the cover 44. The modeling lamp 54 may be preferably in the range of 250 watts. A trigger transformer 56 is mounted within the housing 12 and is designed to step up the incoming voltage to sufficient levels needed for energization of the flash tube 42.

Since excessive heat can be produced when the light unit 10 is used for extended periods, a turbo-type fan 58 is provided to draw air through the second end 16 of the housing 12 and blow it through the lamp element 40 for the purpose of dissipating heat. The air is drawn by the fan 58 through openings in the second end 16 of the housing 12 which are covered by a protective metal grating 60. As a further safeguard against excessive heat build-up, an auto reset thermal overload sensor 62 is adapted to turn the halogen modeling lamp 54 off when internal temperatures within the housing exceed a specified temperature, such as 160° F., to prevent damage to the unit 10. At least one, and preferably two, capacitors 64, preferably of the polycarbonate type, are provided as part of the power circuitry for the fan.

Power is supplied to the unit 10 through a heavy duty multi-pin connector 66 having a base 68 which is secured to the housing 12. The connector 66 is adapted so that power may be applied directly thereto or that conventional connecting cables (not shown) may be provided to connect the unit 10 with photographic power supplies or packs. If the unit 10 is to be used with photographic power supplies of foreign manufacture, 18 especially in areas where 220V is the common supply voltage, an adapter cord assembly 70 may be provided having two connector ends 72 adapted to engage the connector 66, and the power pack (not shown). It is contemplated that the cord assembly 70 may be designed so that one of the connector ends 72 is permanently secured to the connector 66. In the alternative, an adapter cord assembly 70 may be provided having a connector 72 and a connector 74 having a voltage dropping component. Such a component preferably is a capacitor 76 (best shown in FIG. 5B), but may alternatively be a resistor or a transformer. It has been found that the use of the capacitor 76 converts the unit 10 from 220V operation to conventional 120V operation in a manner which reduces the amount of heat which would otherwise be generated by a resistor, and which therefore does not have to be dissipated. Further, the capacitor 76 is less bulky and costly than a transformer.

Figure 5:
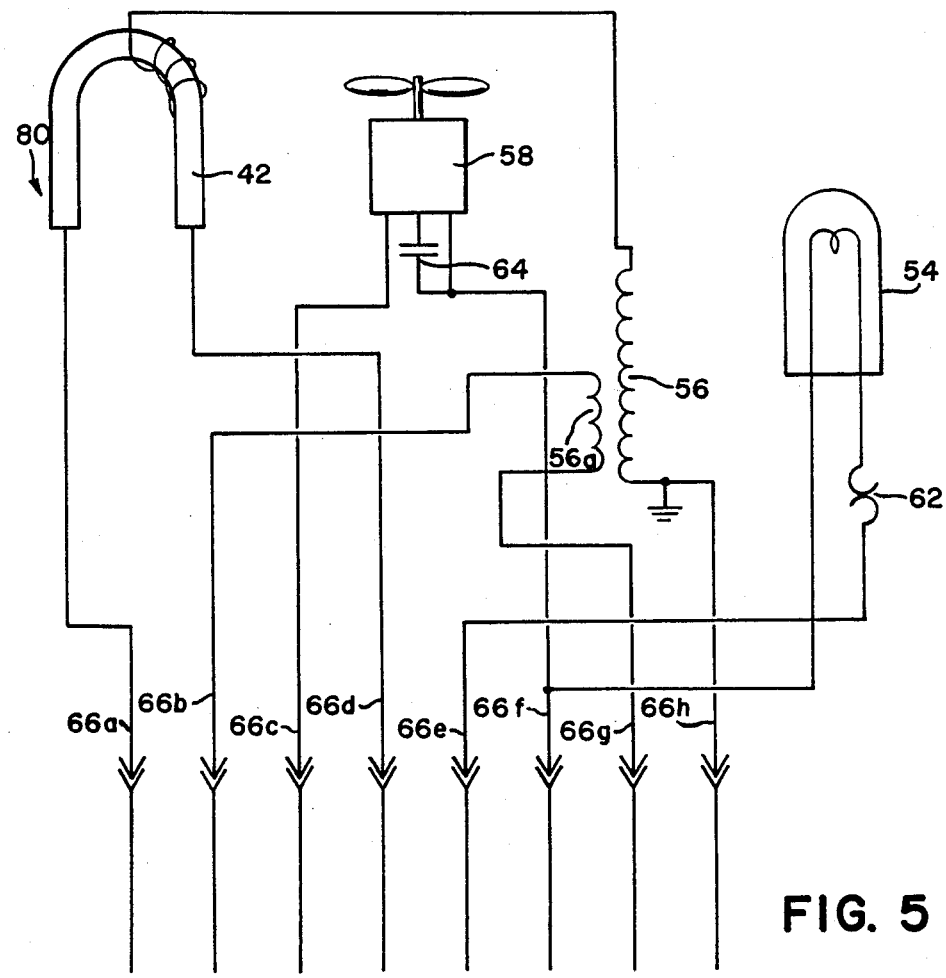
FIG. 5 is a schematic view of the circuit of the invention.
Figure 5A:
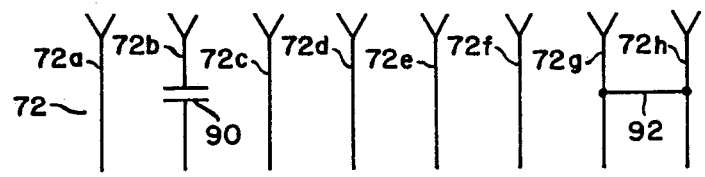
FIG. 5A is an alternate embodiment of a portion of the circuit of FIG. 5.
Figure 5B:
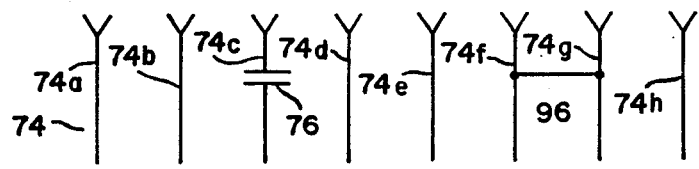
FIG. 5B is a second alternate embodiment of the circuit of FIG. 5.

Referring now to FIGS. 5, 5A and 5B, a schematic of the circuitry of the unit 10 of the invention is depicted and is designated generally at 80. The circuitry 80 includes the flash tube 42, the modeling lamp 54, the trigger transformer 56, the turbo fan 58, the thermal overload sensor 62, as well as various leads 66a–66h which are connected to the multi-pin connector 66. The circuitry 80 can also include the connectors 72 and 74 shown in FIGS. 5A and 5B for use with some European models of power packs or other photographic equipment which have different operating voltages for the fan 58.

Referring now to FIG. 5, the leads 66a and 66d are connected to a source of high voltage DC power which provides from 250 to 1000V, and preferably about 900V to the flash tube 42. The high voltage applied to the flash tube 42 is slightly below the ionization level of the gas in the tube, so that when the trigger circuit operates, the gases will ionize and provide the desired flash. The leads 66b and 66g define a trigger circuit in which the trigger transformer primary 56a is connected. When the trigger circuit is operated, either through the camera shutter directly, or by an intermediary device such as a silicon controlled rectifier, a triac, or a transistor, a capacitor within the power pack, (or outside of it, such as the capacitor 90 provided in connector 72 as shown in FIG. 5A) discharges and this voltage of preferably about 300V DC is transformed to approximately 9000 to 16000V DC and is applied to the coil that surrounds the flash tube as shown in FIG. 5. This high voltage produces an electric field around the tube that results in the gas being ionized, thereby producing the desired flash. The leads 66c and 66f define a circuit for powering the fan 58, which in the preferred embodiment includes the capacitor 64, preferably 0.25 µf.

There are certain European manufacturers that have designed power packs and flash units so that they operate the fans with 220V. If the present unit is intended to operate with such a power pack, the fan circuit must be modified. Since the fan 58 is driven by 120V, the 220V source from the power pack must be reduced and this is preferably done by inserting a capacitor 76 in the fan circuit. This is preferably done by placing the capacitor 76 in the connector 74 (FIG. 5B) which will connect the unit to the power pack. It has been found that the use of a capacitor in this manner rather than a resistor, the conventionally preferred solution, generates less heat, which is a significant operational consideration for the unit 10.

The leads 66e and 66f power the modeling lamp 54. The thermal overload sensor 62 is also connected in this circuit to cut off the modeling lamp 54 when the temperature within the cover 44 exceeds approximately 160° F., thus avoiding damage to the unit 10. The lead 66h serves as the ground reference for the trigger transformer 56.

The unit 10 of the invention is designed to be used with conventional European and U.S. manufactured power packs. To this end, and as previously discussed, the adapter end 74 of the adapter cord assembly 70 (best shown in FIG. 1) may be provided with the circuit modifications to render the unit 10 compatible with most known power packs. Since the adapter cord assembly 70 may include the connector end 72 and the connector end 74, the same connector leads will extend from the end 72 to the end 74, such as shown in FIG. 5B. In addition, a jumper 92 may be provided between the ground lead 72h and the trigger lead 72g, depending upon the internal circuitry of the particular power pack being used.

Thus, through the configuration of the housing of the unit, which permits attachment of adjacent units to any side face, the flash unit of the invention provides a photographer with the capability of readily creating a wider than average variety of flash arrays which may be easily rearranged to suit the requirements of a particular application. In addition, attachments are provided to assure compatibility of the unit with conventional photographic power generating equipment.

While a particular embodiment of the photographic flash lighting unit of the invention has been shown and described, it will be appreciated by those skilled in the art that changes and modifications may be made thereto without departing from the invention in its broader aspects and as set forth in the following claims.

We claim:
1. A photographic flash lighting unit configured to interfit with other like units, comprising:
 a tubular housing which is polygonal in cross-section and having first and second ends, said housing having a plurality of elongate side faces, each of said faces having coupling means, a first plurality of said faces having male coupling means, a second plurality of said faces having female coupling means configured to matingly engage said male coupling means of like units;
 said faces having male coupling means being disposed on said housing in alternating relationship to said faces having female coupling means;
 locking means disposed on each of said faces having like coupling means for securing like lighting units to each other, said locking means including a spring-biased pin member provided to each of said faces of like coupling configuration, each of said pin members having at least one locking pin and being secured to an interior surface of said housing so that said pin projects vertically outwardly from said face;
 lock receiving means for receiving said locking means of like lighting apparatus, said lock receiving means being located at least on said faces which alternate on said housing with said faces having said locking means;
 a lamp element mounted to said housing to project axially from said first end;
 connector means mounted to said second end of said housing for connection to a power supply; and
 circuit means located within said housing to connect said connector means to said lamp for energization thereof.

2. The unit as defined in claim 1 wherein said first plurality of faces is provided with said locking means and said second plurality of faces is provided with said lock receiving means.

3. The unit as defined in claim 1 wherein said pin member is provided with a release formation.

4. The unit as defined in claim 5 wherein said release formation is a tab.

5. The unit as defined in claim 1 wherein said lock receiving means is at least one opening disposed on each of said faces and configured to accommodate one of said locking pins therein.

6. The unit as defined in claim 1 wherein said male and female coupling means respectively comprise mating dovetail tongue and groove formations.

7. The unit as defined in claim 1 further including a fan mounted within said housing and connected to said circuit means so as to cool said lamp.

8. The unit as defined in claim 7 wherein said circuit means includes at least one capacitor adaptable to control voltage to said fan.

9. The unit as defined in claim 1 wherein said circuit means includes voltage dropping means located externally of said housing and adapted to be connected to said connector means for converting said unit to operation with a variety of power supplies.

10. The unit as defined in claim 9 wherein said voltage dropping means is a capacitor.

11. The unit as defined in claim 1 wherein said lamp element includes a flash tube provided with a ceramic base having a reflective coating applied thereon.

12. The unit as defined in claim 11 wherein said coating is metallic and is applied by sputtering.

13. The unit as defined in claim 1 wherein said housing is hexagonal in cross-section.

14. A photographic flash lighting system including a plurality of flash units, each said unit comprising:
a tubular housing which is hexagonal in cross-section and having six elongate parallel outer faces, each of said faces having coupling means, a first plurality of said faces having male coupling means, a second plurality of said faces having female coupling means configured to matingly engage said male coupling means of like units, said faces having male coupling means being disposed on said housing in alternating relationship to said faces having female coupling means;
locking means on each of said first plurality of faces and lock receiving means on each of said second plurality of faces adapted to engage said locking means of like units;
a flash lamp element located in at least one of said units;
connector means mounted to said housing and adapted for connection to a power supply; and
circuit means located within said housing to connect said lamp to said connector means;
said flash units being secured in parallel relation to each other by said mating coupling configurations of adjacent units.

15. The system as defined in claim 14 16 wherein said units of said system are coupled to form a 'Y'-shaped arrangement.

16. The system as defined in claim 14 wherein said units are joined to form a circle arrangement.

17. The system as defined in claim 14 wherein said locking means is a spring-biased pin member mounted to an interior of said housing and having at least one pin adapted to project vertically through said housing.

18. The system as defined in claim 17 wherein said lock receiving means is at least one opening in said housing adapted to receive said pin therein.

19. A housing for a photographic light unit, comprising:
a tubular wall member which is hexagonal in cross-section and has six elongate faces extending the length of said member, each of said faces having coupling means, a first plurality of said faces having male coupling means, a second plurality of said faces having female coupling means configured to matingly engage said male coupling means of like apparatus, said faces having male coupling means being disposed on said housing in alternating relationship to said faces having female coupling means;
a plurality of openings in said housing, said openings disposed in an annular ring adjacent one end of said wall member, at least one said opening being located on each said face; and
a locking pin member associated with each of said first plurality of faces, said pin member being mounted on an interior surface of said wall and having at least one pin adapted to project through said opening and vertically beyond said face, said pin member being biased against the inside surface.

20. The housing as defined in claim 19 wherein said male and female coupling means respectively comprise mating dovetail tongue and groove formations.

21. A photographic flash lighting unit configured to interfit with other like units to form arrays of varying configuration and to be powered by a power supply remotely located from said unit comprising:
a tubular housing which is polygonal in cross-section and having first and second ends, said housing having a plurality of elongate side faces, each of said faces having coupling means, a first plurality of said faces having male coupling means, a second plurality of said faces having female coupling means configured to matingly engage said male coupling means of like units;
said faces having male coupling means being disposed on said housing in alternating relationship to said faces having female coupling means;
locking means disposed on each of said faces having like coupling means for securing like lighting units to each other;
locking receiving means for receiving said locking means of like lighting apparatus, said lock receiving means being located at least on said faces which alternate on said housing with said faces having said locking means;
a lamp element mounted to said housing to project axially from said first end;
connector means configured for mounting to said second end of said housing and for establishing electrical connection between said unit and the remotely located power supply, said connector means being adaptable for connection to a variety of power supplies; and
circuit means located within said housing to connect said connector means to said lamp for energization thereof.

22. The unit as defined in claim 21 wherein said circuit means includes voltage dropping means located externally of said housing and adapted to be connected to said connector means for converting said unit to enable operation with a variety of power supplies.

23. The unit as defined in claim 22 where in said voltage dropping means is a capacitor.

24. The unit as defined in claim 23 wherein said connector means is a connector cord assembly having connector means at each end thereof, said capacitor being located in one of said connector means.

* * * * *